United States Patent
Waldorff

[15] 3,668,947
[45] June 13, 1972

[54] GEARWHEEL MACHINE

[72] Inventor: Jorgen Frederik Waldorff, Rodovre, Denmark

[73] Assignee: Danfoss A/S, Nordborg, Denmark

[22] Filed: Oct. 2, 1970

[21] Appl. No.: 77,542

[30] Foreign Application Priority Data

Oct. 10, 1969 Germany ............. P 19 51 100.3

[52] U.S. Cl. .................................................. 74/804
[51] Int. Cl. .................................................. F16h 1/28
[58] Field of Search ........................................ 74/804

[56] References Cited

UNITED STATES PATENTS

| | | | |
|---|---|---|---|
| 1,833,993 | 12/1931 | Hill | 74/804 X |
| 3,472,097 | 10/1969 | Huska | 74/804 X |

FOREIGN PATENTS OR APPLICATIONS

| | | | |
|---|---|---|---|
| 512,604 | 11/1930 | Germany | 74/804 |
| 534,761 | 1/1955 | Belgium | 74/804 |

*Primary Examiner*—Arthur I. McKeon
*Attorney*—Wayne B. Easton

[57] ABSTRACT

The invention relates to a gerotor mechanism of the type having an internally toothed ring member which surrounds an eccentrically displaced, externally toothed wheel member having one less teeth. The teeth of the ring member have the form of rollers which is old but the pitch circle of the ring member has a particular diameter relative to a circle which is tangent to the rollers so that in operation the rollers are caused to rotate continuously in one direction only.

2 Claims, 1 Drawing Figure

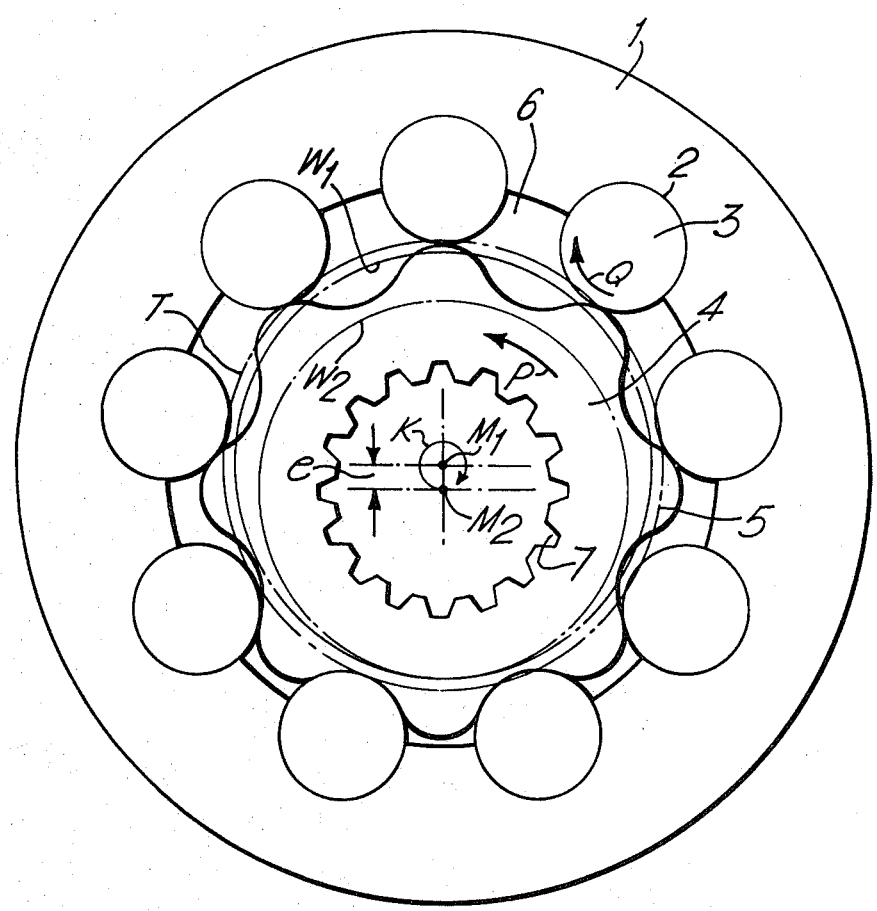

GEARWHEEL MACHINE

The invention relates to a gearwheel machine comprising an externally toothed wheel and an internally toothed ring having one more tooth, the teeth of the ring being formed by rotatable cylindrical rollers.

Efforts have been made to replace the fixed teeth of the ring by rotatable rollers so as to replace the sliding contact, occurring between the toothed wheel and the toothed ring during operation and of necessity leading to wear, by a rolling contact. In practice however it has been found that the rollers soon seize up and act as fixed teeth even if the machine is oil-driven.

The object of the invention is to provide a gearwheel machine of this kind in which rotation of the rollers during the entire operating period is ensured.

According to the invention, this object is achieved by the pitch circle of the toothed ring having a diameter that is at most equal to the diameter of the circle tangent upon the rollers.

This arrangement ensures that during relative movement between the toothed wheel and the toothed ring, the rollers are always rotated in one direction. This results in hydrodynamic lubrication between each roller and roller bearing, since the fluid used in the geared machine is always moved by the rollers in one direction and into the bearing gap. Consequently, pure rolling contact with correspondingly reduced wear occurs between the teeth of the toothed wheel and the rollers, whereas although there is sliding contact between the rollers and the roller bearings, the bearing friction and wear are reduced to a minimum by the efficient lubrication.

In particular, this arrangement prevents the rollers from rotating to and fro as is the case when the pitch circle of the toothed ring is greater than the circle tangent upon the rollers. No thorough lubrication in the roller bearing occurs when the rollers move to and fro. Instead, fluid passed to the bearing surface during the forward movement is carried back again during the return movement. Consequently, zones occur near the bearing which are not lubricated by the fluid and which lead to seizing up of the rollers.

It is particularly advantageous if the eccentricity $e$ meets the requirement $$e_0/1.20 \leq e \leq e_0/1.04,$$

the eccentricity $e_0$ occurring when the pitch circle of the toothed ring being equal to the circle tangent upon the rollers.

Alteration of the eccentricity also alters the pitch circle of the toothed ring. It is advantageous to use an eccentricity that is somewhat less than $e_0$, since this ensures that the rollers are continuously rotated during operation of the machine, i.e. that they never come to a stop. A smaller eccentricity also gives a good effect in the case of gearwheel machines which operate with a universal joint shaft, since this then needs to be swung through a smaller angle, i.e. it can be of shorter construction. On the other hand, the eccentricity should not be too small as otherwise the displacement volume is reduced. Within the limits stated however, the displacement volume can be balanced without difficulty by a greater width of tooth, i.e. longer rollers.

The invention will now be described in more detail by reference to an embodiment illustrated schematically in the drawing.

The geared machine illustrated comprises a fixed housing 1 containing recesses 2 in which rollers 3 are rotatably mounted. The housing 1 and the rollers 3 constitute an internally toothed ring having nine teeth.

Also provided is an externally toothed wheel 4 having eight teeth 5. This toothed ring is so designed that it makes line-contact with each roller 3, so that a series of displacement chambers 6 is created, each chamber being defined by two rollers 3 and the housing 1 disposed between them, two teeth 5 and root of the tooth disposed between them, as well as two side walls, not illustrated. The head of a universal joint shaft can be inserted in an inner toothed portion 7 so as to rotate therewith.

The center-point of the toothed rim is at $M_1$, and that of the toothed ring at $M_2$. When the machine is in operation, the center-point $M_2$ moves along a circle K about the center-point $M_1$, travel along the circle K being completed each time the toothed ring 4 rotates through one tooth-pitch. The radius of the circle K is equal to the eccentricity $e$. The universal joint shaft connects the toothed ring to an input or output shaft, which is coaxial with the center-point $M_1$.

Also shown in the drawing are the pitch circles $W_1$ and $W_2$ for the toothed ring and toothed wheel respectively, as well as a circle T tangent upon the rollers 3. It can be seen that the pitch circle $W_1$ of the toothed ring is smaller than the tangent circle T.

If the toothed ring 4 is regarded as rotating in the direction of the arrow P, then all the rollers 3 rotate only in the direction of the arrow 0. The fluid, particularly oil, used by the machine is thus continuously passed from the displacement chamber 6 into the gap between the bearing 2 and the roller 3, so that good hydrodynamic lubrication is achieved.

It can be seen that by increasing the eccentricity $e$, the pitch circle $W_2$ as well as the pitch circle $W_1$ could increase until finally the pitch circle $W_1$ is equal to the tangent circle T. In the present embodiment, the eccentricity $e$ is 92 percent of the eccentricity $e_0$ that applies for the extreme case.

The machine of the invention is particularly suitable for oil pumps (fuel oil and oil for hydraulic systems), as well as for oleomatic motors.

I claim:

1. A gerotor comprising an externally toothed wheel and an internally toothed ring member eccentrically disposed relative to said wheel and having one tooth more than said wheel, said ring member having pockets formed with cylindrical surface portions, cylindrically shaped rollers rotatably disposed in said pockets, said rollers forming the teeth of said ring member, said ring member having a pitch circle $W_1$ which is at most equal to a circle T which is tangent to said teeth of said ring member.

2. A gerotor according to claim 1 wherein the eccentricity $e$ between said wheel and said ring member relative to an eccentricity $e_0$ which occurs when said circle $W_1$ equals said circle T satisfies the condition:

$$e_0/1.20 \leq e \leq e_0/1.04$$

* * * * *